May 3, 1927. 1,627,545
B. MEYROWITZ
AUTOMOBILE TRAFFIC SIGNALING APPARATUS
Filed Aug. 17, 1926 4 Sheets-Sheet 1
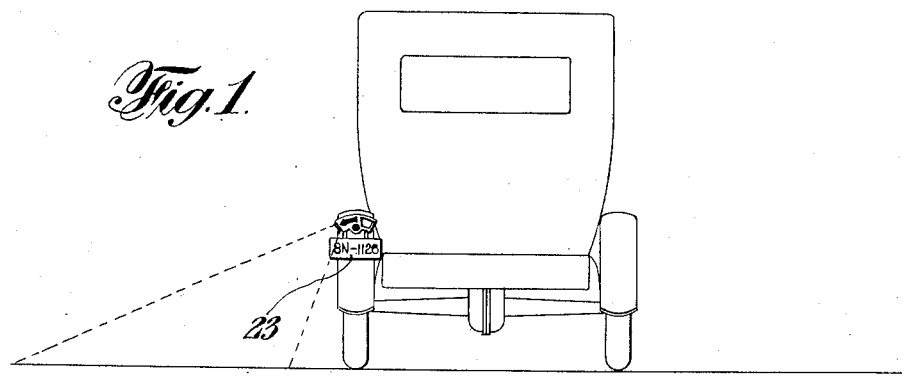
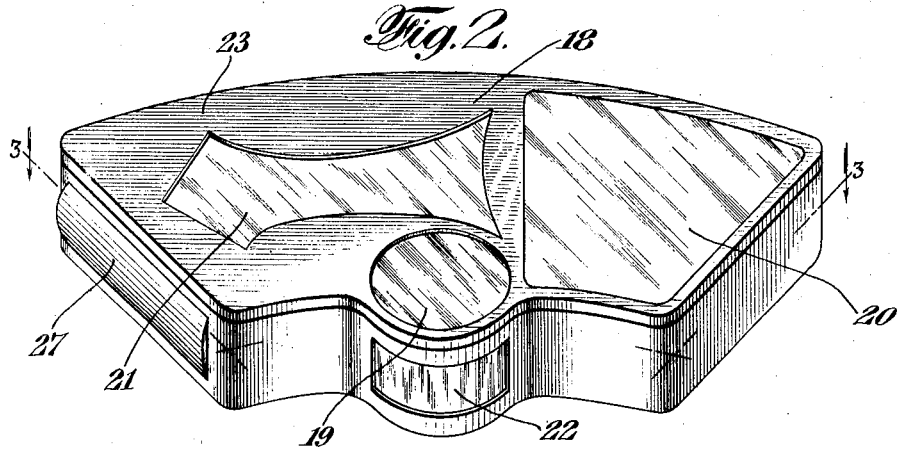
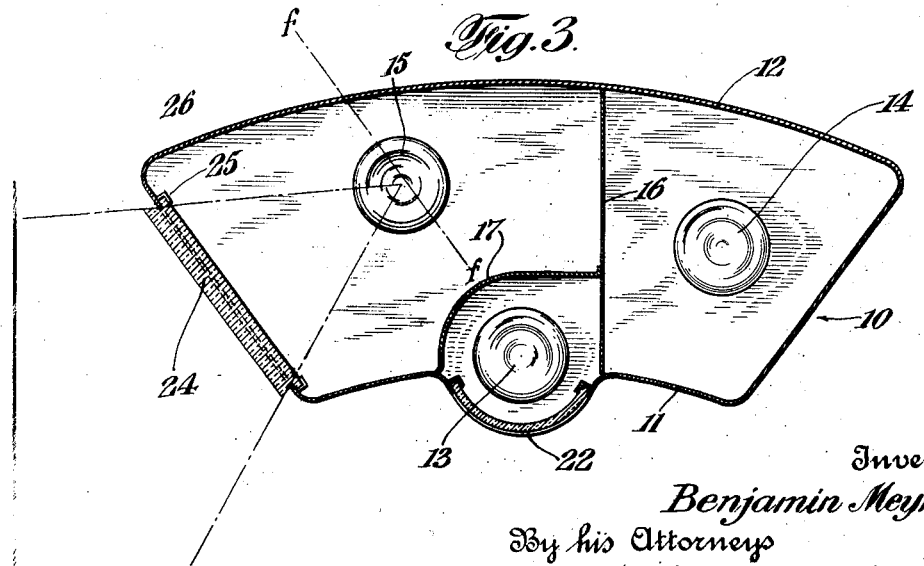
Inventor
Benjamin Meyrowitz
By his Attorneys May 3, 1927. 1,627,545
B. MEYROWITZ
AUTOMOBILE TRAFFIC SIGNALING APPARATUS
Filed Aug. 17, 1926   4 Sheets-Sheet 2
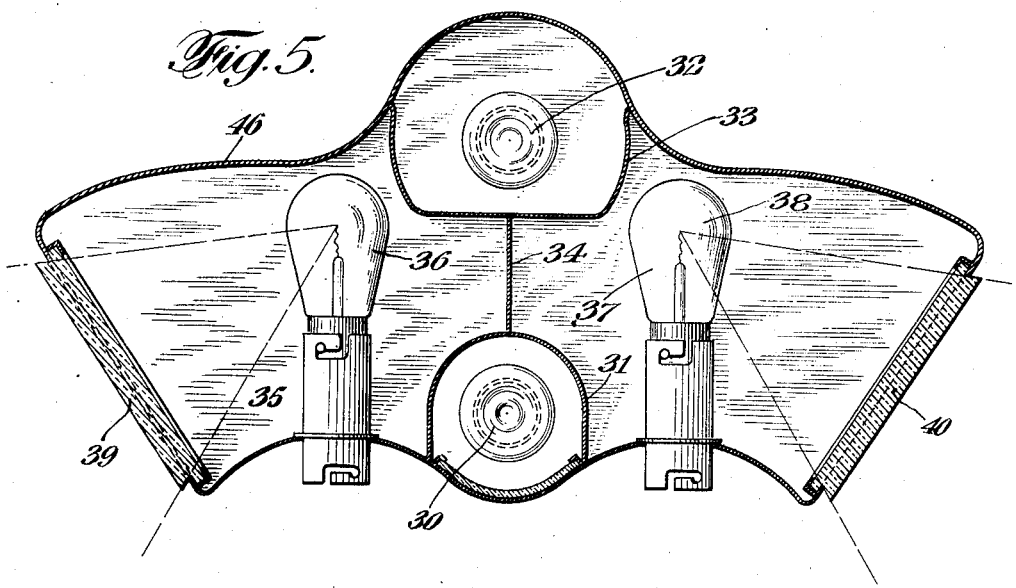
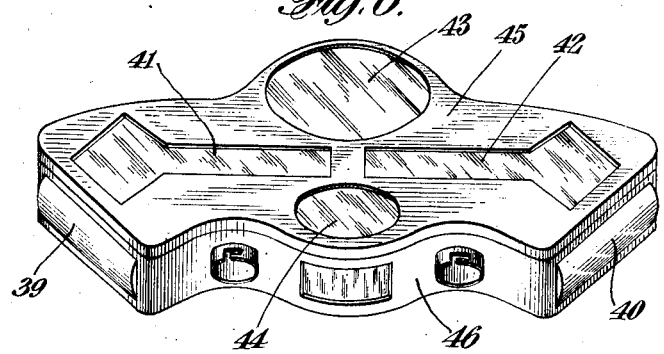
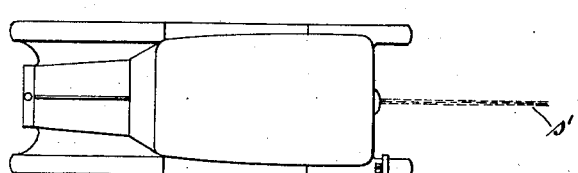
Inventor
Benjamin Meyrowitz
By his Attorneys May 3, 1927.
B. MEYROWITZ
1,627,545
AUTOMOBILE TRAFFIC SIGNALING APPARATUS
Filed Aug. 17, 1926      4 Sheets-Sheet 3
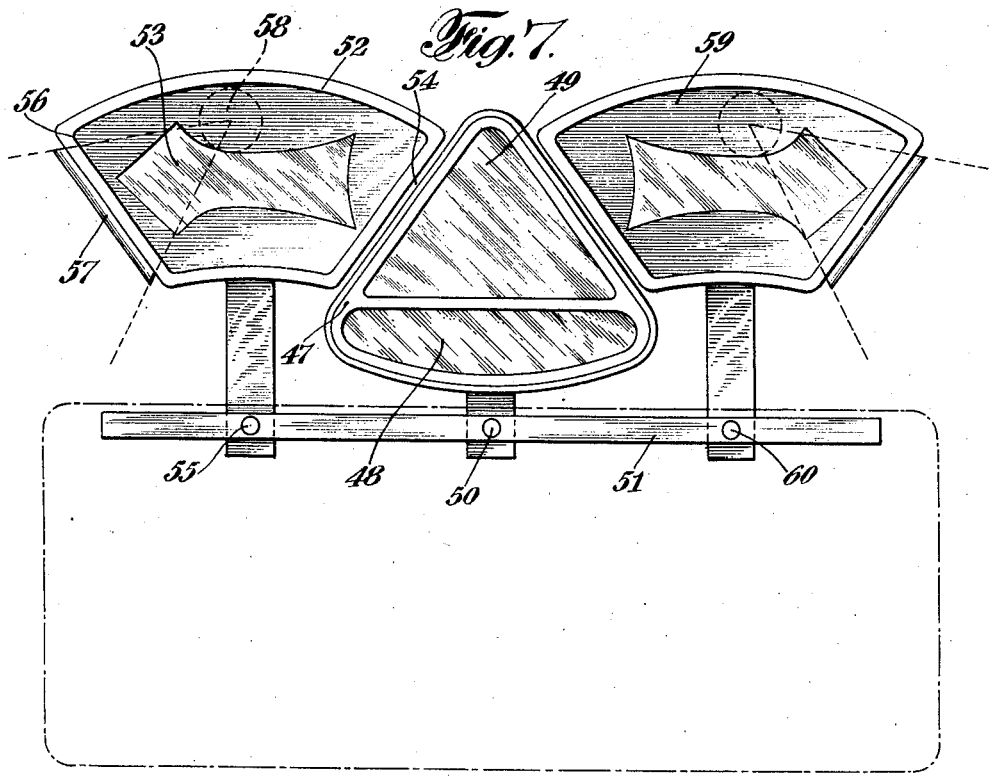
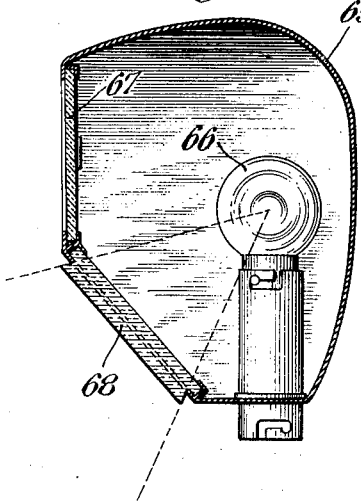
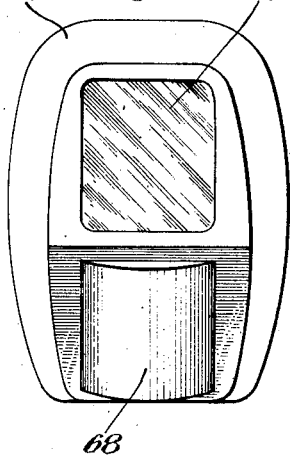
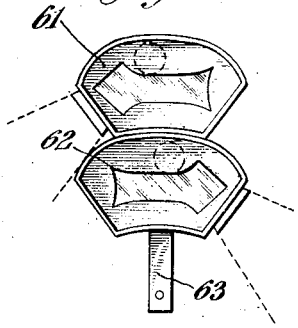
Inventor
Benjamin Meyrowitz
By his Attorneys May 3, 1927.
B. MEYROWITZ
1,627,545
AUTOMOBILE TRAFFIC SIGNALING APPARATUS
Filed Aug. 17, 1926    4 Sheets-Sheet 4
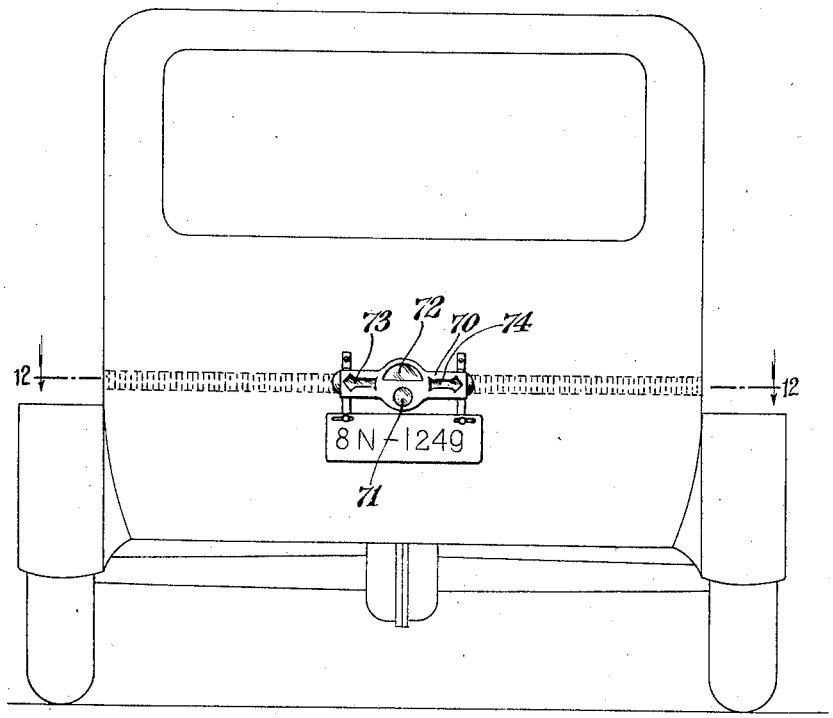
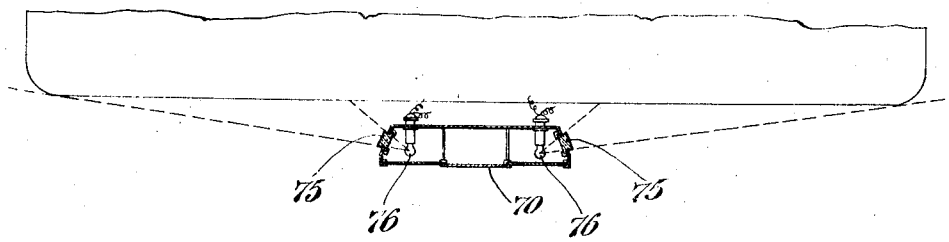
Inventor
Benjamin Meyrowitz
By his Attorneys Patented May 3, 1927.

1,627,545

UNITED STATES PATENT OFFICE.

BENJAMIN MEYROWITZ, OF NEW YORK, N. Y.

AUTOMOBILE TRAFFIC-SIGNALING APPARATUS.

Application filed August 17, 1926. Serial No. 129,680.

My present invention relates to signal means, more particularly of the type used on automobiles.

It may be noted that in common practice, the stop light, the tail light and the turn signal light, if any, are associated in close proximity to each other, frequently in a single casing usually mounted on the left rear fender or in the middle of the spare tire or tire carrier. In this practice, it is frequently difficult, if not impossible, in traffic conditions to satisfactorily distinguish or discriminate the turn light from the stop light or from the tail light, unless the signals are viewed from close proximity of the automobile and even then, the conscious attention of the driver is required to distinguish one signal from the other.

This limitation is a consequence of a principle elementary to optometrists and ophthalmologists that for normal vision the outline of a black object on a white background, can be distinguished under daylight conditions only when it subtends an angle of not less than 5 minutes upon the retina and the individual elements or parts of a letter or other symbol can be distinguished only when subtending an angle of not less than 1 minute upon the retina. In practice, however, the conditions of operation are less favorable, for the signal windows are colored, usually red or green, the source of light is an incandescent lamp rather than daylight, and, as statistics show, the majority of people have subnormal vision. For all three of these reasons, if the signal lights are to be entirely effective, the signal windows and letters must be so large or wide as to subtend upon the retina at the maximum distance at which the signal is to be discriminated, a materially larger angle than under the ideal conditions previously stated.

It is, accordingly, an object of the invention to provide signaling means to reliably, unmistakably and discriminatingly indicate at a substantial distance, without objectionable glare, however, one of a number of contiguous signals, without the need for employing any unusually large and expensive device for the purpose or adding elaborate mechanical contraptions, but, on the contrary, employing as the luminous source, the same electric light bulb heretofore used in automobile signal lights, in a casing differing but little, if at all, in general construction and dimensions from those in common use.

Another object is to afford a reliable signal of the type indicated, the reading or interpretation of which requires no direct vision on the part of the person or persons to whom the signal is addressed, but, on the contrary, will stimulate indirect vision by the peripheral parts of the retina, that is, will protrude itself upon the consciousness, though the attention be directed elsewhere.

Another object is to provide a signal, eliminating the inconvenience and ambiguity and ineffectiveness in night driving, of the practice of extending the hand from the window to signal a turn, a stop or a reverse.

According to the invention, the signal light casing is provided with a suitable projecting system for causing light from the ordinary signal bulb to be projected in the form of a focused beam, to intercept a part of the vehicle wall or of the ground closely contiguous to the vehicle in a sharp luminous area, intensified by the screen effect of the vehicle wall or ground respectively, thereby producing a signal, which cannot but be recognized and discriminated without conscious mental operation.

In a preferred embodiment, my objects are accomplished by providing the casing enclosing the turn signal light, for instance, with a light projecting system for directing preferably from the same source of light that illuminates the turn signal light window, a downwardly inclined narrow fan-shaped beam, which will intersect the ground, to sharply define thereon a narrow elongated luminous streak, beginning in close proximity to the side of the vehicle and extending transversely outward therefrom. Such streak being in close proximity to the turn signal light window is immediately associated therewith by those to whom the signal is addressed and is readily visible at a substantial distance, and so obtrusive that it cannot be ignored even when viewed from the peripheral part of the retina of the eye.

Any appropriate projecting system may be employed to effect the streak noted. I prefer to accomplish the result by the use of a lens system, comprising a single lens having the light source substantially at the focus thereof, said lens with a substantial converging effect in the horizontal meridian and with little or no converging effect with respect to the light in the vertical meridian, the light and lens being so arranged with respect to each other that the fan-shaped beam is inclined downwardly at an angle sufficient to produce the streak described. In the preferred specific construction, a cylindrical lens is employed inclined outwardly at the correspondingly shaped casing end, the light source being preferably disposed near the principal focus, and to advantage nearest to focus at the upper edge of the lens.

Where the turn signal light is disposed near the rear of the vehicle, regardless whether or not it is associated with the stop light, the streak projected by my turn light affords a desirable backing up light for illuminating the floor, the adjacent wall of the runway and the door jamb of a garage in backing thereinto.

The signal streak device is applicable not only to the turn signal light, but also to the stop signal, to discriminate the latter more readily from the tail light, the streak in the latter case being preferably projected to extend longitudinally rearward from the vehicle or along the body of the vehicle.

In another application, especially useful in connection with large interurban trucks, the signal light unit may be disposed upon the rear wall of the vehicle and the lens system may be arranged to project the narrow beam as a streak extending horizontally along the substantial expanse of the rear wall rather than on the ground.

In the accompanying drawings in which are shown one or more of various possible embodiments of the several features of the invention, Fig. 1 is a rear diagrammatic view of an automobile indicating a signaling unit mounted on the left fender and showing the manner of projection of the streak, Fig. 2 is a perspective view on a larger scale, indicating the external appearance of the signal unit shown in Fig. 1, Fig. 3 is a transverse sectional view taken on the line 3—3 of Fig. 2, Fig. 4 is a plan view of an automobile indicating the side and rear signal streaks, Fig. 5 is a view similar to Fig. 3 of a modified form of the invention, Fig. 6 is a perspective view similar to Fig. 2 of the embodiment shown in Fig. 5, Fig. 7 is a view indicating the arrangement on a license plate bar, of an alternative embodiment of the invention, Fig. 8 is a diagrammatic view indicating another specific application of the invention, Fig. 9 is a transverse sectional view indicating a stop light application, Fig. 10 is a rear view of the embodiment of Fig. 9, Fig. 11 is a view similar to Fig. 1 indicating an application to trucks, and, Fig. 12 is a transverse sectional view taken along the line 12—12 of Fig. 11.

Referring now to Figs. 1, 2 and 3, I have shown illustratively a signal light casing of more or less conventional form, said casing being generally trapezoidal in shape with downwardly converging lateral walls 10, a shorter curved lower wall 11 and a longer upper wall 12. Centrally near the lower wall of the casing is the tail light bulb 13. Near the right-hand of the casing is a stop light signal bulb 14 and near the left end, a turn light signal bulb 15. The casing is provided with partitions 16 and 17 which prevent commingling of the rays from the respective bulbs. The casing is provided with a face plate 18 having appropriate window plates therein, associated with the respective lights, so that when circuit to one of these lights is closed, only the corresponding window will be illuminated. The window 19 of the tail light is preferably circular, the window 20 of the stop light is trapezoidal, and the window 21 of the turn light is preferably in the shape of an arrow, although it may be in the form of letters or in any other appropriate shape. Preferably an arcuate window 22 is provided at the bottom of the casing below the bulb 13 through which light will pass to illuminate the license plate 23 immediately below the casing, to which the casing is preferably clamped, as best shown in Fig. 1. The construction thus far described in itself is not my invention and is more or less conventional.

According to my invention, I preferably dispose in the inclined left hand wall 10 of the casing a cylindrical lens 24. This lens preferably has an integral rim 25 encased within a flange 26 formed from the casing and has its curved area 27 protruding from the frame. The lens has its straight rectilinear non-converging meridian extending in the upright plane along the height of the casing and its curvature extending horizontally or transversely of the casing. The filament of the light bulb 15 is disposed preferably at or slightly less than the principal focal distance from the luminous source and but little nearer the lens than the principal focal line $f—f$ thereof. By the arrangement described, it will be apparent that there is little or no convergence or refraction in the vertical plane and a fan-shaped beam is, accordingly, projected symmetrically with respect to the downwardly inclined principal axis $a—a$ of the cylindrical lens, as appears most clearly from Figs. 1 and 3. The convergence in the horizontal meridian causes the beam to be narrow in horizontal cross-section, as appears best from Fig. 4 at $s$. The beam will, accordingly, intercept the ground, to form a narrow highly luminous streak extending transversely outward laterally from the left side of the vehicle. The streak will be sharply defined at its lateral edges and the ground serves as a light intensifying screen to cause most brilliant illumination, sharply contrasted with the dark background of the road. This will be apparent from the circumstance that the focused rays directed to the upper edge of the lens are most sharply converged and the degree of convergence decreases progressively to a minimum, for those rays directed to the lower edge of the lens. However, as best seen in Fig. 1, the lower rays have a shorter path of travel before they reach the ground than have the upper ones, so that the beam is of uniform intensity throughout its width.

The projecting system, it will be seen, distorts the image of the filament to a greater extent in one meridian than it does in the other, and directs the beam so that the distorted filament image is projected as an illuminated concentrated light pattern upon the ground or other light intensifying screen.

In a desirable specific manner of carrying the invention into practice, I may employ a cylindrical lens 2½ inches high and 2 inches wide of a focal length of 4 inches, and dispose the luminous filament at a distance of say 3¾ inches from the upper edge of the lens, and 3⅛ inches from the lower edge of the lens. With the cylindrical lens inclined at about 30 to 35 degrees with respect to the ground, and at a level of 2 feet above the ground, the streak projected upon the ground will be 8 to 10 inches in width and 8 to 10 feet in length. The streak is of intensity so sharp that it is immediately and readily visible from a substantial distance of 150 to 200 feet or more and will not be drowned out or noticeably dimmed, even by the headlights of adjacent automobiles, nor will it suffer materially in brightness when used on a dark or light absorbing road. Of course, the dimensions and relations specified are merely illustrative, and the result may be accomplished by projection systems of other more or less equivalent specifications. It is preferred, however, to provide a streak of length not much less than that above specified. The streak extending outwardly from the immediate proximity of the side of the vehicle, cannot but be associated with the contiguous illuminated arrow turn signal and will be unmistakably recognized as a turn signal. The projected streak has a high intensity of illumination by reason of its proximity to the source of light and by reason of the approximation thereof to focus. The projected streak cannot be mistaken for a search light or spot light or headlight or parking or other light.

My turn signal streak when disposed, as preferred, at the rear of the vehicle, serves effectively to illuminate the floor, the adjacent wall of the runway and the door jamb of a garage in backing into the same.

In use, I may interlock the turn signal switch with the steering mechanism, but inasmuch as it is desirable to effect the signal well in advance of commencing the turn, I prefer to control the turn signal switch by a distinct manual operation conveniently executed from near the steering wheel or post. The turn signal switch is advantageously interlocked with the reverse gear in any familiar well-understood manner, inasmuch as a reverse operation usually precedes a turn.

As will be immediately apparent, the invention dispenses entirely with the annoyance of requiring the driver to extend his hand through the open window, with the utter ineffectiveness of such signal in night driving, and with the ambiguity of such hand signal, serving as it does to indicate a right turn, a left turn, a stop or a reverse.

While a single arrow window pointing toward the left, and a corresponding streak may satisfactorily serve to indicate both a left and right turn, just as the extended left hand has served in the past, I have shown in Figs. 5 and 6, an alternative embodiment in which separate and distinct arrows and corresponding luminous streaks are employed for each side. In this embodiment, it will be seen that the tail light bulb 30 is disposed near the lower edge of the casing and enclosed by a partition 31, substantially as in Fig. 2 and the stop light 32 within a partition 33 near the upper edge, a median wall 34 separating the chamber 35 at the left, enclosing the left-hand signal bulb 36 from the corresponding chamber 37 at the right enclosing the right-hand signal bulb 38. Lenses 39 and 40 respectively are provided in the downwardly inclined lateral faces of the casing, each to project a streak in the corresponding direction, depending on which of the turn signal light circuits is closed. Fig. 6 shows the appearance of the left and right arrow windows 41 and 42 respectively, and the corresponding stop light window 43 and tail light window 44, all in a unitary facing plate 45 for the bulb enclosing lens-carrying casing 46.

It will be understood that in each embodiment, if the design of the casing requires a curved rather than a straight end face, the cylindrical lens may be correspondingly curved along its axis to fit in such frame, without effecting any substantial change in the refractive characteristics thereof. For this purpose, the curve should approximate an arc of a circle of radius equal to the focus length of the lens.

In Fig. 7 is shown an alternative arrangement for employing my turn signal light as a separate unit capable of being conveniently employed with more or less conventional stop-tail light units now in use. I have shown such conventional stop-tail light comprising a generally triangular casing 47 having an elongated tail light window 48 near its lower end and a triangular stop light window 49 near its upper end, said casing being clamped as at 50 centrally of the license plate supporting bar 51.

According to the present invention, a generally trapezoidal casing 52 is provided with an arrow window face plate 53 which is mounted with its one inclined face 54 contiguous to or in contact with the inclined face of the triangular casing and is clamped to bar 51 as at 55. The casing 52 has at its outer lateral face 56 the cylindrical projecting lens 57, identical with that shown in Fig. 2 and described, for projecting upon the ground a streak identical with the previously described. The light bulb 58 as in other embodiments is near the focal line of lens 57 and serves to illuminate window 53. While but one of the turn signal lights need be used, I have also shown in Fig. 7 a right turn signal casing 59 similar to that described and similarly clamped at 60 to the license bar to the right of the stop turn signal casing. Each part may be used separately in any appropriate position, as for instance, the left arrow on the left fender, the stop light in the center and the right arrow on the right fender.

In Fig. 8 is shown an arrangement of left and right turn signal casings 61 and 62 respectively identical with those shown in Fig. 7, but one superposed directly over the other and both secured by a common strap 63 to a common support (not shown) which as in Fig. 7 may be the license plate supporting bar. Other combinations will be apparent to those skilled in the art.

In Figs. 9 and 10, I have shown an application of my invention to a combination stop-reverse light. I have shown in these views a common form of tail light casing 65, mounting in the lower end thereof, a tail light bulb 66 and having at the rear face thereof, a generally rectilinear window 67 usually red, which becomes luminous when the stop light circuit is closed. In this embodiment, I have shown below the stop light window a lens 68 preferably a cylindrical lens of the same character as that shown in Fig. 2 inclined rearward and downward in the mounted position and disposed in such manner that its focal line is substantially at the incandescent filament of the lamp 66, preferably in the general relation described, in connection with Figs. 2 and 3. It follows as is immediately apparent, that when the stop light or backing-up light circuit is closed, not only does the window 67 become luminous, but there is projected a longitudinal luminous streak as in Fig. 4, rearwardly from the vehicle which is, of course, immediately associated in the mind with the stop light. The illumination is, moreover, helpful in backing up. The stop light streak being operated from the usual stop light bulb, the circuit controlling the same is governed in known manner from the brake pedal, the transmission lever, the reverse lever, or in any other desired manner. The stop light streak lens can be readily employed in the embodiments of Figs. 1, 2, 5 and 6.

In Figs. 11 and 12 I have shown an application of the invention, especially suitable for heavy interurban passenger trucks, in which the streak is projected not upon the ground but upon the body of the truck itself, preferably upon the rear wall. In the specific embodiment illustratively shown, the light casing 70 is somewhat similar to that shown in Fig. 5 and is mounted illustratively, centrally of the back of the vehicle and associated with the license plate immediately therebelow. The face plate of the casing is illustratively shown with a tail light window 71, a stop light window 72 and left and right turn signal arrow windows 73 and 74 respectively. The ends of the casing, as shown, extend obliquely inward toward each other in back of the face panel and each has a cylindrical lens 75 therein, the curvature of which in this embodiment is in the vertical meridian in the mounted device and the straight non-reflecting element of which is in the horizontal meridian. It follows from the arrangement described that the light bulb 76 associated with each of the lenses and disposed substantially at the focus thereof, will project through the lens, a beam diverging horizontally in the shape of a fan, and narrow in the vertical plane, which will intersect the back of the vehicle at a point in close proximity to the casing and cast thereon a sharply defined horizontal luminous streak designating a turn signal.

It is, of course, understood that in the last embodiment as in that of Figs. 2 and 3, I may employ a single arrow used to designate both left and right turns. In that case it would be preferable to mount the unit at the right hand of the vehicle, so that for each turn, the streak would extend from the right edge out toward the left of the vehicle.

While I have shown and prefer the cylindrical lens specifically described and shown, it will be understood that I may employ other projecting lenses or projecting systems of more or less equivalent effect, my invention from its broadest aspects residing essentially in projecting a sharply defined luminous area, preferably a streak, upon the ground or upon the vehicle, preferably extending from the close proximity of the light with which it is to be associated, so that the association in the minds of those to whom the signal is addressed, will be unfailing, and more particularly in which the light in question is used in close proximity of other signal lights, for other purposes with respect to which the distinguishing luminous streak serves to readily discriminate.

It is understood that I could, instead of a simple cylindrical lens, employ duplicate cylindrical lenses, so that instead of a single streak, there would be cast upon the ground, a light pattern comprising a plurality of parallel streaks.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:

1. A luminous device for an automobile comprising a casing adapted to be secured in upright position upon an automobile, said casing having a source of light therein, a signal window in said casing rendered luminous by said source, said casing having a cylindrical lens disposed with its focal line substantially at the source of light and arranged with respect to said source to project a fan-shaped beam having its axis inclined with respect to the vehicle, so that a flat surface associated with the vehicle and contiguous to said window, will intensify the narrow streak of light which is the intersection of said beam with said surface.

2. A turn signal light comprising a casing adapted to be mounted on an automobile and having a source of light therein, said casing including a window at the face of the casing rendered luminous by the source and a downwardly inclined lens at an end of the casing, said lens having little or no converging effect on the light in its vertical meridian and having a converging effect in its horizontal meridian, whereby in use the lens will project a downwardly inclined fan-shaped beam intercepting the ground to form a narrow bright streak thereon beginning contiguous to the vehicle.

3. A turn signal for an automobile comprising a casing having a light therein, a turn signal window at the face of said casing rendered luminous by said light, an outward, downwardly inclined cylindrical lens at the end of said casing, said light being substantially at the focal line of said lens whereby the lens will project a narrow fan-shaped beam intercepting the ground to define a narrow luminous streak thereon, extending outwardly from the side of the vehicle.

4. A turn signal device comprising a casing adapted to be mounted near the rear of a motor vehicle, an outward, downwardly inclined cylindrical lens at an end of said casing, a lamp in said casing having its filament substantially at the principal focal line of said lens, whereby a fan-shaped beam will be projected to intercept the ground as a laterally directed streak in close proximity to the vehicle, said streak being an elongated light pattern constituting the distorted but complete image of the filament.

5. A signal for an automobile comprising a casing having a source of light therein, a window at the face of the casing rendered luminous by said light and signifying a turn, an outward, downwardly inclined cylindrical lens having its converging meridian arranged horizontally, said light substantially at the focal line of said lens whereby in use the flash of said luminous window will be accompanied by a sharply defined narrow luminous streak extending transversely outwardly from the vehicle, said streak being the intersection with the ground of the downwardly inclined fan-shaped beam projected by the device.

6. A signal light device comprising a plurality of associated signal windows each having a characteristic significance, said signal windows in such close contiguity as to be likely to be mistaken one for the other, the window of one of said signal lights having associated therewith a light projecting system for casting a luminous pattern of light extending from the neighborhood of the corresponding window along a flat surface adjacent the light and thereby forming a readily discriminated signal.

7. Signaling means on an automobile and of the type comprising a number of closely contiguous windows each with an associated source of light, said windows including a tail light, a stop light and a turn signal, said windows being of character such as to be easily mistaken one for the other, the combination in which the turn light signal includes a lens projecting system at the end of the corresponding casing portion, said system having a substantial converging effect in a horizontal meridian and little or no converging effect in the vertical meridian, the signal light for the turn signal being disposed substantially at the focus of said lens, said lens being arranged with respect to said light to incline the fan-shaped beam therefrom downwardly whereby there will flash simultaneously with the turn signal window a sharply defined narrow luminous streak extending on the ground transversely outwardly from the vehicle.

8. A signal device for an automobile and of the type comprising a unitary casing adapted to be mounted on the rear fender of an automobile, said casing including a face having a tail light window at the lower end thereof, a stop light window at the right and a turn signal indicating window at the left, light sources confined within said casing associated each with one only of the corresponding windows, the combination in which said casing has an outward, downwardly inclined lens at the left end thereof with the turn signal light source substantially at the focus of said lens, said lens having with respect to said light source a substantial converging effect in a horizontal meridian and a much lesser effect in the vertical meridian whereby in use of the turn signal the illumination of the corresponding window will be accompanied by the projection of a sharply defined narrow luminous streak extending transversely outwardly from the vehicle along the ground.

9. A signaling unit for a motor vehicle and of the type comprising a casing of generally trapezoidal form with its lateral edges converging downwardly, said casing having a tail light window centrally of the lower part thereof, a stop light window at the right end thereof and a turn signal arrow window at the left thereof, light bulbs within the casing associated one with each window, each screened or isolated from the other windows, the combination in which the left outwardly inclined end of the casing has a cylindrical lens therein with its converging effect in the horizontal meridian, said turn signal light source being disposed substantially along the focal line of the lens.

10. A turn signal unit comprising a casing having a turn signal arrow window in the face thereof, said casing having a converging lens at an end thereof, a source of light within the casing disposed at the focus of said lens and adapted to render said window luminous, said lens being arranged with respect to said source of light to project a downwardly inclined beam, said lens having its converging effect in the horizontal meridian and little or no converging effect in the vertical meridian.

11. A combined turn signal and backing up light comprising a casing adapted to be mounted near the rear of a motor vehicle, said casing including a turn signal window at the face thereof and having a laterally and downwardly directed converging light projecting system therein, including a lateral aperture in said casing and a common source of light for said projecting system and for said window, whereby in use as a turn signal a sharply defined light pattern will be flashed contiguous to the illuminated window and whereby in use as a backing up light the illuminated window will aid in lighting the roadway rearwardly of the vehicle and the projected beam will afford intense illumination laterally of the vehicle.

12. A luminous signal device adapted to be mounted on a motor vehicle and serving to indicate a change in the motion thereof, said device comprising a casing with a signal window at the face thereof, said casing having a light projecting system therein including an aperture distinct from said window, said system adapted to direct the beam of light produced thereby through said aperture in an oblique direction for interception in close proximity to said casing by a surface associated with the vehicle, and a common source of light for said projecting system and for said window, whereby the illuminated window and the intensified illumination due to the intercepted beam jointly will constitute a discriminating vehicle motion change signal.

13. A turn signal device comprising a casing adapted to be mounted near the rear of a vehicle and having a turn signal window in the face thereof, and also having a converging light projecting system directed laterally thereof and downwardly to project upon the ground a sharply defined elongated light pattern closely associated with the turn signal window, and means for simultaneously providing light for said window and said projecting system.

14. Signaling means on an automobile, and of the type comprising a number of closely contiguous windows, each with an associated source of light, said windows including a tail light, a stop light and a turn signal, said windows being of character such as to be easily mistaken in use, one for the other; the combination in which the turn light signal includes a light projecting system having an aperture at the end of the corresponding casing portion, said system distorting the image of the filament to a greater extent in one meridian than in the other and directing the beam downward to project upon the ground an elongated concentrated light pattern, constituting the distorted but complete image of the filament.

Signed at New York city, in the county of New York and State of New York, this 14th day of August, A. D. 1926.

BENJAMIN MEYROWITZ.